United States Patent [19]

Harris

[11] 3,809,121

[45] *May 7, 1974

[54] QUICK DISCONNECT PRESSURIZATION APPARATUS

[76] Inventor: Harold Ronald Harris, 12741 Canter St., Garden Grove, Calif. 92645

[ * ] Notice: The portion of the term of this patent subsequent to Mar. 6, 1990, has been disclaimed.

[22] Filed: May 1, 1972

[21] Appl. No.: 249,005

[52] U.S. Cl.............. 137/613, 137/583, 137/798, 251/148
[51] Int. Cl.................... F16l 29/00, F16k 45/00
[58] Field of Search............. 137/613, 614.04, 583; 285/1; 251/149.6, 148, 798; 222/3

[56] References Cited
UNITED STATES PATENTS

| 3,719,205 | 3/1973 | Harris | 137/583 |
|---|---|---|---|
| 3,384,133 | 5/1968 | Gordon | 137/613 X |
| 3,125,322 | 3/1964 | Halstead | 251/149.9 |
| 2,272,243 | 2/1942 | Jacobsson et al. | 137/613 X |
| 3,336,053 | 8/1967 | Carse | 285/1 |
| 1,751,970 | 3/1930 | Baird | 222/3 |
| 1,353,320 | 9/1921 | Crommett | 222/3 |
| 3,124,157 | 3/1964 | Krzewina | 137/583 |
| 1,287,838 | 12/1918 | Benzion | 137/583 X |
| 1,234,726 | 7/1917 | Bruckner | 222/3 X |
| 2,119,473 | 4/1938 | Smith et al. | 137/613 X |

Primary Examiner—William R. Cline
Assistant Examiner—Ira S. Lazarus
Attorney, Agent, or Firm—Fulwider Patton Rieber Lee & Utecht

[57] ABSTRACT

Quick disconnect pressurization apparatus including a control valve mounted on a pressure bottle and having an integral female socket projecting from the housing thereof. A regulator has a connector which is formed on its free end with a male plug for telescopical receipt in such socket and a quick disconnect coupling is provided for locking the plug in the socket thereby enabling the socket to be relatively short so a conventional protective cap may be conveniently installed over the control valve while providing for quick and convenient connection and disconnection of the socket and plug.

3 Claims, 4 Drawing Figures

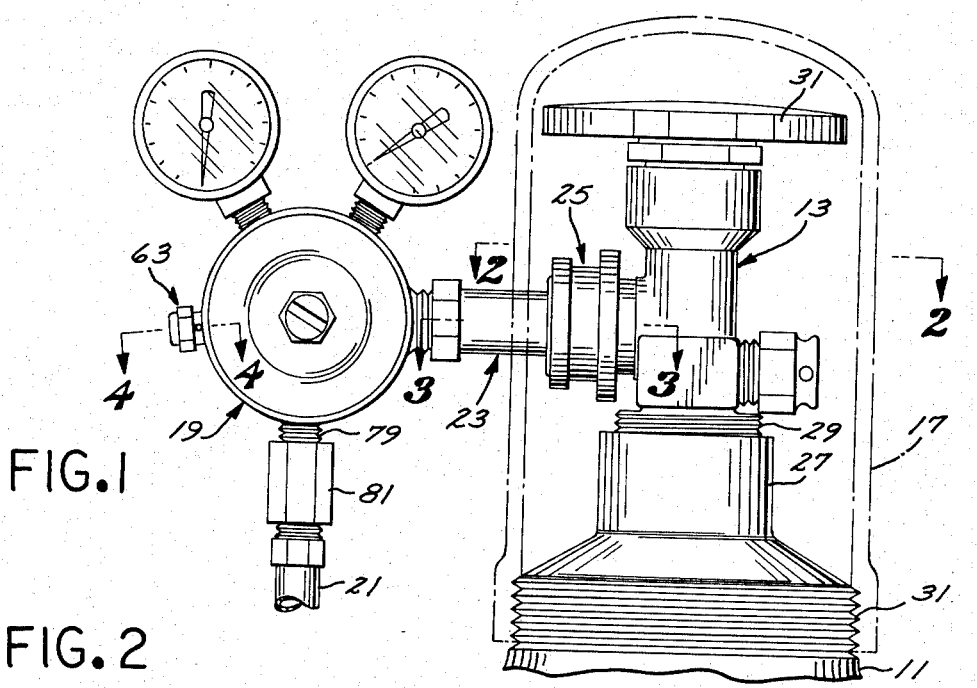
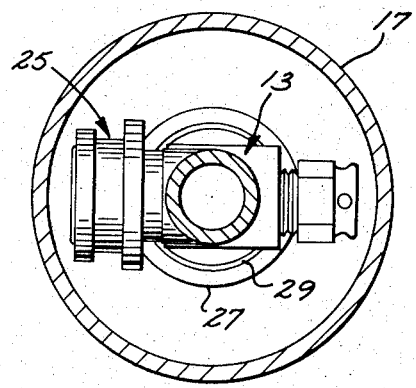
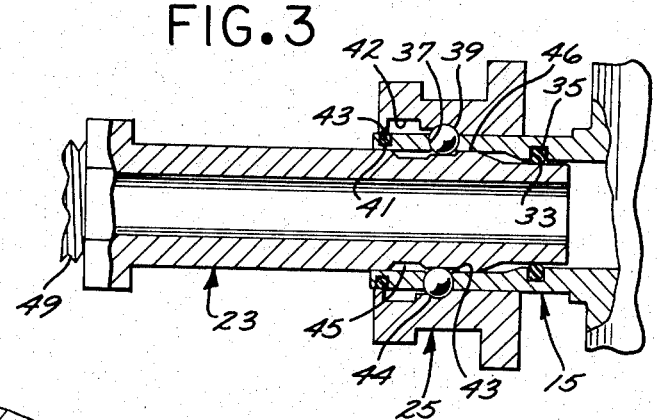
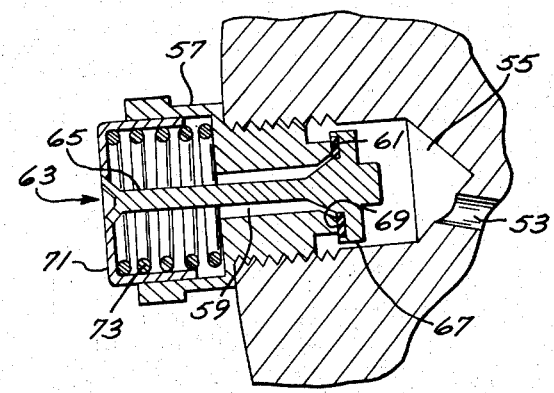

QUICK DISCONNECT PRESSURIZATION APPARATUS

BACKGROUND OF THE INVENTION

1. Field of the Invention:

The quick disconnect pressurization apparatus of present invention relates to devices for pressurizing systems such as beverage containers for convenient pouring of beverages from such containers.

2. Description of the Prior Art:

In my co-pending patent application Ser. No. 115,010, filed Feb. 12, 1971, and now U.S. Pat. No. 3,719,205 I noted that it has been common practice to provide pressurization systems incorporating threaded tubular connections for connection with a pressurization bottle thereby requiring workmen setting up such pressurizing systems to carry tools and consume an undue amount of time in connecting such threaded connections. The pressurization system disclosed in such co-pending application is directed to a pressurization bottle having an integral threaded nipple to which a disconnect fitting is connected by means of a threaded nut arrangement. This system suffers the shortcoming that attachment of the quick disconnect fitting obstructs installation of a conventional protective cap over the control valve of the pressurization bottle thereby making it inconvenient to protect the control valve from damage.

SUMMARY OF THE INVENTION

The present invention is characterized by a pressurization bottle having a control valve mounted thereon and formed with a projecting integral quick disconnect female socket which is sufficiently short in length to enable a conventional protective cover to be installed over the control valve without obstruction by such socket.

The objects and advantages of the quick disconnect pressurization apparatus of present invention will become apparent from a consideration of the following detailed description when taken in conjunction with the accompanying drawing.

DESCRIPTION OF THE DRAWING

FIG. 1 is a front view of a quick disconnect pressurization system embodying the present invention;

FIG. 2 is a horizontal sectional view taken along the line 2—2 of FIG. 1;

FIG. 3 is a horizontal sectional view, in enlarged scale, taken along the line 3—3 of FIG. 1; and FIG. 4 is a sectional view, in enlarged scale, taken along the line 4—4 of FIG 1.

DESCRIPTION OF THE PREFERRED EMBODIMENT

The quick disconnect pressurization apparatus of present invention includes a pressurization bottle 11 which may be filled with high pressure $CO_2$ and has a control valve, generally designated 13, mounted thereon. The housing of the control valve 13 is formed with an integral female socket, generally designated 15, which is sufficiently short in length to enable a conventional protective cap 17 to be installed over such valve 13. A pressure regulator, generally designated 19, is provided for regulating pressure to a pressurization conduit 21 leading to a beverage container and the regulator housing has a male plug, generally designated 23, connected therewith for telescopical receipt in the female socket 15. A quick disconnect coupling, generally designated 25, couples such plug and socket together.

Thus, the pressurization bottle 11 may be shipped to the site of use with the control valve 13 mounted thereon and the protective cap 17 installed thereover to protect such valve from damage. When it is desirable to install the pressurization bottle 11, a workman need merely remove the protective cap 17 and rapidly couple the regulator 19 to the valve 13 without use of special wrenches, tools and the like.

The pressurization bottle 11 is necked down on its upper extremity to form a reduced-in-diameter neck 27 which is internally threaded for receipt of the threaded base 29 of the control valve 13. The neck 27 is enlarged and threaded to form an externally threaded shoulder 31 which has the internally threaded open end of the protective cap 17 screwed thereon.

The valve 13 includes a circular handle 31 on its upper end and has its housing formed with a transversely projecting tubular socket 15. Referring to FIG. 3, the tubular socket 15 is formed in its inner extremity with a necked down interior portion that has an interior O-ring groove 33 formed therein for receipt of a sealing O-ring 35. The axially outer extremity of the socket 15 is formed with a plurality of radially projecting through windows 37 which have radially movable ball bearings 39 received therein for locking the plug 23 in position with respect to the socket 15. The socket 15 is further formed in its axial outer extremity with a radially outwardly opening groove 41 which receives a retaining ring 43.

The quick disconnect coupling 25 includes a retractable collar which is formed interiorly with side-by-side release and locking grooves 42 and 44.

The plug 23 is formed intermediately with a pair of adjacent stepped grooves which form a retaining groove 43 and a release groove 45, the retaining groove 43 having a locking rim 46 formed therebehind. Still referring to FIG. 3, the left hand end of the plug member 23 is internally threaded for being screwed onto an externally threaded nipple 49 that forms the inlet to the regulator 19.

The regulator 19 has its housing formed with a bleed passage 53 (FIG. 4) which leads to a bleed valve chamber 55. The external portion of the bleed valve chamber 55 is internally threaded for receipt of an externally threaded bleed valve insert 57 which is formed with a central bleed passage 59 and terminates in its axially inner portion with a bleed valve seat 61. A bleed valve poppet assembly, generally designated 63, is formed with an elongated stem 65 that projects inwardly through the bleed passage 59 and is formed on its inner extremity with an enlarged in-cross-section poppet 67 that has a sealing gasket 69 mounted on the back side thereof for engagement with the bleed poppet seat 61. The axially outer extremity of the poppet assembly 63 is affixed to a bleed valve cap 71 which is biased axially outwardly by means of a coil compression spring 73. Thus, the bleed valve sealing gasket 69 is normally biased into seating engagement with the bleed valve seat 61 and depression of the cap 71 unseats the poppet 67 to permit escape of $CO_2$ from the bleed passage 53 and out passage 59.

The outlet of the regulator 19 is formed by an externally threaded nipple 79 which is connected with the pressurization conduit 21 by means of a connector fitting.

In operation, the pressurization bottles 11 are charged at a filling plant and after full charging thereof, the valve 31 is closed and the protective cap 17 screwed into place to protect the valve 13 from damage during shipment and handling of the bottle 11.

When the service personnel deliver the bottle 11 to the site of use, as for example, a cocktail lounge, the protective cap 17 is removed and the quick disconnect sleeve 25 telescoped inwardly on the socket 15 to register the release groove 42 with the ball bearings 39 to permit radial outward movement of such bearings in the windows 37. The regulator 19 is then connected to the valve 13 by telescoping the free extremity of the plug 23 into the socket 15 to register the release groove 45 with the ball bearings 39. This permits radially inward movement of the bearings 39 as the quick disconnect coupling sleeve is telescoped outwardly on the socket 15 to register the retaining groove 44 with such bearings to maintain such bearings positioned radially inwardly in the respective windows 37. The plug 23 may then be telescoped axially outwardly in the socket 15 to register the retaining groove 43 with the bearings 39 to maintain such bearings urged radially outwardly in the respective windows 37 and prevent further axial outward movement of such plug 23.

The pressurization conduit 21 is then connected to the outlet nipple 79 of the regulator 19 and the handle 31 of the valve 13 grasped to open such valve and apply pressure to the regulator 19 to thereby pressurize the beverage container (not shown). It will be realized that as long as the regulator 19 is maintained pressurized, the plug 23 will be forcefully held in its axially outer position in the socket 15 and that, in order to telescope such plug 23 axially inwardly, the pressure in the regulator 19 would have to be overcome.

Consequently, when it is desirable to disconnect the regulator 19 from the bottle 11 for replacement thereof by a new bottle, the valve 13 is closed and the service personnel will depress the bleed valve poppet assembly 63 to open the bleed valve and permit gas flow through the bleed passages 53 and 59 to relieve pressure on the system and enable the plug 23 to be freely telescoped axially inwardly in the socket 15. The plug 23 is then telescoped inwardly to register the release groove 45 with the bearings 39 to permit axial inward movement of such bearings to enable the sleeve 25 to be telescoped axially inwardly to register the collar release groove 42 with the bearings 39 to permit such bearings to move radially outwardly in the windows 37 to clear the locking collar 46 as the plug 23 is removed from the socket 15. The regulator 19 is then free for ready coupling to a charged replacement pressurization bottle 11.

From the foregoing it will be apparent that the quick disconnect pressurization apparatus of present invention provides a convenient means for rapidly connecting and disconnecting a pressurization bottle from a system to be pressurized while enabling the control valve on such bottle to be normally protected by means of the protective cap.

Various modifications and changes may be made with regard to the foregoing detailed description without departing from the spirit of the invention.

I claim:

1. Quick disconnect pressurization apparatus comprising:
    a pressure bottle including a protective cap in the form of an inverted cup shape and removably secured to the top of said bottle;
    control valve means mounted on said bottle and including an integral transversely projecting female socket terminating short of the wall of said cap and having high pressure sealing means therein and a plurality of radially projecting through windows in the wall thereof;
    a pressure regulator including a flow passage;
    a bleed passage in said regulator for venting pressure from the flow passage therethrough;
    a bleed valve controlling flow through said bleed passage and selectively actuable to bleed pressure therefrom;
    a regulator connector for connection with said pressure regulator and including tube means formed on one end with plug means for telescoping into said socket means and including on its outer periphery radially outwardly opening retaining groove means registerable with said windows and including interior sealing means, said tube means including regulator connecting means on its opposite extremity; and
    quick disconnect means including a plurality of latching bearings disposed in said windows and a retainer collar telescoped over said socket member and including an inwardly opening peripheral release groove for receipt of at least a portion of said bearings to free said bearings for outward movement when said release groove is registered therewith whereby said regulator connector may be connected with said regulator, said plug means telescoped into said socket means to register said retaining means with said windows, said collar telescoped to move said release groove out of registration with said windows to thereby quickly connect said regulator to said pressure bottle and when said regulator is to be changed to a different bottle said bleed valve may be actuated to bleed pressure from said flow passage and said quick disconnect released.

2. Quick disconnect pressurization apparatus as set forth in claim 1 wherein said regulator includes threaded connector nipple means and;
    said regulator connecting means includes thread means engaged with said nipple means.

3. Quick disconnect pressurization apparatus as set forth in claim 1 wherein:
    said plug means includes release groove means disposed adjacent said retaining groove means but extending deeper into the wall of said plug means than said retaining groove means.

* * * * *